(12) United States Patent
Henderson et al.

(10) Patent No.: US 10,975,890 B2
(45) Date of Patent: Apr. 13, 2021

(54) HYDRAULIC FLUID POWER TRANSMISSION

(71) Applicant: QUOCEANT LIMITED, Edinburgh (GB)

(72) Inventors: Ross McKay Henderson, Edinburgh (GB); Richard William Yemm, Edinburgh (GB); Carn Nathaniel George Gibson, Edinburgh (GB)

(73) Assignee: Artemis Intelligent Power Limited, Loamhead (GB)

( * ) Notice: Subject to any disclaimer, the term of this patent is extended or adjusted under 35 U.S.C. 154(b) by 0 days.

(21) Appl. No.: 16/079,147

(22) PCT Filed: Feb. 22, 2017

(86) PCT No.: PCT/GB2017/050456
§ 371 (c)(1),
(2) Date: Aug. 23, 2018

(87) PCT Pub. No.: WO2017/144875
PCT Pub. Date: Aug. 31, 2017

(65) Prior Publication Data
US 2019/0055964 A1    Feb. 21, 2019

(30) Foreign Application Priority Data

Feb. 23, 2016    (EP) .................................. 16157032

(51) Int. Cl.
*F15B 1/02*    (2006.01)
(52) U.S. Cl.
CPC ..... *F15B 1/024* (2013.01); *F15B 2211/40592* (2013.01)
(58) Field of Classification Search
CPC ................. F15B 2211/40592; F15B 1/024
See application file for complete search history.

(56) References Cited

U.S. PATENT DOCUMENTS

| 4,046,270 A | * | 9/1977 | Baron | ........................ E02F 3/30 414/694 |
| 7,441,405 B2 | * | 10/2008 | Aarestad | ............... E02F 9/2217 60/413 |

(Continued)

FOREIGN PATENT DOCUMENTS

| DE | 102011109877 A1 | 11/2012 |
| GB | 1474719 A | 11/1975 |
| WO | 2015149806 A1 | 6/2017 |

OTHER PUBLICATIONS

International Search Report for International Application No. PCT/GB2017/050456, dated Jun. 7, 2017.

*Primary Examiner* — F Daniel Lopez
(74) *Attorney, Agent, or Firm* — Snell & Wilmer L.L.P.; Kent A. Lembke

(57) ABSTRACT

The invention relates to a hydraulic fluid power transmission comprising: actuator apparatus having a plurality of chambers, each of the chambers having a respective fluid driving surface configured to drive or be driven by hydraulic fluid therein; a discretised pressure control system configured to selectively connect one or more first chambers of the said plurality of chambers to one of a plurality of hydraulic fluid sources or sinks, at least two of the plurality of hydraulic fluid sources or sinks having different fluid pressures; a continuous pressure control system configured to control the pressure of hydraulic fluid, or a flow rate of hydraulic fluid, input to or output from one or more second chambers of the said plurality of chambers, the pressure or flow rate of the hydraulic fluid input to or output from the second chambers being thereby variable within a range of pressures or flow rates respectively; and a controller configured to control the discretised and continuous pressure control systems to thereby regulate a property of the actuator affected by the hydraulic fluid pressure in the said chambers.

14 Claims, 7 Drawing Sheets

(56) References Cited

U.S. PATENT DOCUMENTS

| | | |
|---|---|---|
| 2005/0066655 A1 | 3/2005 | Aarestad et al. |
| 2012/0096846 A1 | 4/2012 | Kalinin |
| 2013/0082465 A1 | 4/2013 | Frich |
| 2015/0152887 A1 | 6/2015 | Helbig et al. |

\* cited by examiner

HYDRAULIC FLUID POWER TRANSMISSION

FIELD OF THE INVENTION

The invention relates to a hydraulic fluid power transmission and a method of transmitting hydraulic fluid power.

BACKGROUND TO THE INVENTION

The load applied by hydraulic actuators can be controlled in two main ways: continuous smooth pressure control to the actuator or actuators; or switching the total area of an actuator or actuators between high and low pressure to produce discrete or "quantised" load steps (rather than a smoothly varying function).

A straightforward and commonly used means of continuously controlling the pressure applied to an actuator is by using a proportional control valve to regulate the pressure in the actuator chamber directly. Fluid is pumped up to a high pressure and stored in an accumulator. When the actuator is to be driven a proportional control valve is used to throttle much of this pressure away to produce an intermediate pressure that is applied to the actuator to drive it at a prescribed load or speed. When the actuator must resist motion a control valve throttles pressure generated in the actuator back to low pressure reservoir. While being simple and potentially permitting high instantaneous powers this approach is of course very inefficient and wasteful as control can only be effected in either mode by dissipating excess pressure energy as heat and noise.

Another common method is to use a closed hydraulic circuit where a single bidirectional hydraulic pump-motor (operable to function as a pump or a motor in different operating modes) is used to alternately take fluid from one side of a bidirectional actuator and pump it into the other. This allows for continuous and high bandwidth control of load and motion but instantaneous power is limited to that of the pump-motor, no energy storage or smoothing is possible, and while usually better than the purely dissipating system above (in most circumstances) part load efficiency is poor due to the full instantaneous power rating of the pump-motor machine and the fact that it must run continuously.

A third method, illustrated in FIG. 1, uses a pair of pump-motors 10, 12 on a common shaft 14 which creates a true continuously variable transmission with energy storage. One pump-motor 10 exchanges fluid between a high pressure energy store 16 and a low pressure reservoir 18, under control of its displacement, to provide a bi-directional torque to the common shaft 14. The other pump-motor 12 can then use this torque to transmit flow bi-directionally to or from the actuator 20. Thus power can be transmitted between the actuator 20 and the energy store 16. A hydraulic pump or motor 21 coupled to a prime mover or generator 22 may be provided in communication with the energy store 16 to thereby provide an overall power source or sink of the average power requirements of the system. This system allows for power exchange and storage and a much smaller prime mover or generator rating but suffers from the instantaneous power and part load efficiency limits of the rotating machines.

As well as avoiding the need to rate the prime mover or generator for the instantaneous power requirements (as does the quantised system described below), this system allows continuously variable transmission of flow, load and power without the discrete steps of a quantised system. On the other hand, while common in mobile and industrial applications where cost and efficiency is not a primary concern (for example in offshore lifting equipment, or in large earth moving equipment), conventional fluid power transforming systems would have fundamental drawbacks that prevent their useful application in renewable energy applications where the high peak-to-average power and flow ratios mean that the high capital costs and high losses at part load would be unacceptable given the wider economic drivers.

Quantised transmissions typically use digitally controlled fast acting valves to actively pressurise and de-pressurise discrete actuator areas. This alters the aggregate area over which a nominally steady pressure is applied to vary the total applied force in a series of steps rather than as a smooth function. This is known as a 'quantised' system and the process of approximating the desired continuous system or function with a series of steps is known as 'quantisation'. In hydraulic transmissions such an approach provides for rapid control of force with relatively very efficient power transmission between the actuators and a local energy store. The working pressure in the energy store may be controllable via a secondary transmission (generation/supply) system.

Quantised approximation to continuous control can be achieved by selecting from the available discrete load steps in real time. A quantised fluid power transmission uses digitally controlled hydraulic valves to admit flow between the individual areas of the load bearing actuators (e.g. either side of hydraulic cylinder pistons or between the ports of rotary hydraulic actuators) and the high or low pressure parts of the circuit. Hence the net forces applied by each actuator area, and hence the load as a whole, can be controlled in real time by combining different chamber pressures in sequence with accurate timing.

An example of a quantised transmission is shown in FIG. 2 for the case of a simple fixed displacement rotary actuator 30. In this example, single actuator chambers of an actuator 30 operate in opposing directions, the actuator chambers being selectively connected to a high pressure energy store 32 or a low pressure reservoir 34 by way of respective pairs 36, 38 of electronically controlled low and high pressure valves 40, 42. The valves may be switched open or closed to admit flow to or from the actuators from or to the high or low pressure galleries to which they are connected to control the pressure in each actuator chamber. There are three possible load states of the actuator 30: zero; and one step in either direction, the magnitude of the load steps being a function of the relative actuator area (e.g. the area of a fluid driving surface of a piston of the actuator) and the step pressure applied. Additional actuators can be added in parallel together to increase the available load and number of load steps. The greater the number of steps the closer the stepped load profile will approximate a continuous load control function (but the greater the number of components, overall complexity and cost).

The quantised transmission may be hydraulically coupled (e.g. by way of energy store 32) to a hydraulic pump or motor 43 coupled to a prime mover or generator 44, thereby providing an overall power source or sink to the system.

For any applied load the absorbed power passes to and from the energy storage system without passing through any finite displacement and inefficient rotating machines. The flow only has to pass through the switched inlet and outlet valves and any plumbing connections. These can be sized to accept effectively unlimited flow potential at very little cost and complexity. The quantised transmission thus provides a route between the actuator(s) and the power pack (or electricity generator) components through a set of digitally controlled valves with no fixed losses and minimal restriction of the fluid. This offers lower losses and improved efficiency compared to a design using conventional variable displacement pump/motors to vary the pressure in the primary actuators. This is because the losses associated with conventional variable displacement pump/motors include leakage, churning, friction, and parasitic losses in the boost system that are not present in the quantised transmission using digital valves to pressurise and depressurise discrete actuation steps.

Furthermore, the quantised system can transmit power and flow over a range only limited by the fluid resistance through the digital valves and fluid connections (connections required for any system), whereas the finite rating of any variable displacement pump/motor arranged in line with the actuator(s) must also limit the power rating of the whole primary actuation system. The latter is a far greater restriction in terms of power rating and equipment cost, size, and poor part-load efficiency.

For a given power handling capability, the cost of the digital control manifolds required to implement the quantised transmission are relatively low when compared to variable displacement pump-motors. The quantised system has relatively flat efficiency across the power range: there are zero fixed losses (except for the relatively tiny power requirements of the digital control solenoids), flow losses lie only in fluid transit, and volumetric losses are only significant for very small actuator motions. A directly coupled variable displacement pump/motor transmission would suffer excessive losses at low powers. Sizing a variable displacement pump/motor to meet a given power range makes it very inefficient towards the bottom of that power range. Therefore, for applications involving large ratios of peak to average power and flow, such as in renewable energy power take-off or in heave compensation systems, conventional systems are ill-suited.

A major drawback of the quantised approach lies in the application of discrete load steps rather than a continuously variable load. Hysteresis, is required in the quantisation process to avoid limit cycling (instability where the quantised system switches rapidly back and forth between two states due to interaction with the step load and the dynamic response of the system affecting the demand signal) around transitions so at practical step sizes, the quantisation process must introduce a significant phase shift from the ideal load signal to maintain stable operation. This limits the performance of the load and motion control system as a whole to well below that possible with a continuous load control.

The switching of pressures in the hydraulic cylinders leads to a stepped load profile when a smoothly varying one would be preferable from a control point of view. The steps in load can cause significant limitations to the gains that may be attained in a force or motion control loop. In many applications, a quantised system is not viable due to the need for absolute motion control, the need to hold static loads, and/or the requirement to smoothly control the motion of elements with low inertia. Continuously varying the pressure in the hydraulic actuators is a necessary or attractive feature for the vast majority of applications. The only way to achieve this with a digital quantised system alone would be to have a very large number of very small actuator load steps which will not be attractive or practical for many applications.

For the vast majority of applications to date, continually varying the pressure applied to the actuator has been used in preference to the step changes that are present in the quantised transmission. However, a digitally controlled quantised system offers major advantages in efficiency of power transmission and in power and flow capacity for a given cost and size of equipment. Although quantised transmission offers potentially greater efficiencies than the continuous transmission it cannot be used for a number of applications due to its stepped output.

An improved hydraulic transmission would therefore be desirable.

SUMMARY OF THE INVENTION

A first aspect of the invention provides a hydraulic fluid power transmission comprising: actuator apparatus having a plurality of chambers, each of the chambers having a respective fluid driving surface configured to drive or be driven by hydraulic fluid therein; a discretised pressure control system configured (e.g. programmed) to selectively connect one or more first chambers of the said plurality of chambers to one of a plurality of hydraulic fluid sources or sinks, at least two of the plurality of hydraulic fluid sources or sinks having different fluid pressures; a continuous pressure control system configured (e.g. programmed) to control the pressure of hydraulic fluid, or a flow rate of hydraulic fluid, input to or output from one or more second chambers of the said plurality of chambers, the pressure or flow rate of the hydraulic fluid input to or output from the second chambers being thereby variable within a range of pressures or flow rates respectively. The hydraulic fluid power transmission typically further comprises a controller configured to control the discretised and continuous pressure control systems to thereby regulate a property of the actuator apparatus affected by the hydraulic fluid pressure in the said chambers.

Typically the said at least two of the hydraulic sources or sinks have different pressures, there being a discrete step between their pressures.

As the one or more first chambers are selectively connected to one of a plurality of hydraulic fluid sources or sinks, a direct transmission of hydraulic fluid from a hydraulic fluid source to the said first chambers, or to a hydraulic fluid sink from the said first chambers, is provided. This hydraulic fluid does not need to flow via any finite displacement or inefficient rotating machines, which means that the instantaneous powers are effectively unlimited and the energy losses are much lower than for a continuously variable transmission.

As the pressure or flow rate of hydraulic fluid flowing into or out of the second chamber(s) can be controlled within a range of pressures or flow rates respectively, the continuously variable transmission of hydraulic fluid flow, load and power can be achieved without the discrete steps of the discretised pressure control system.

By providing both discretised and continuous pressure control systems, the efficiency benefits of the discretised pressure control system can be achieved without the discrete steps in the pressure(s) of the first chamber(s) being propagated to the said property of the actuator apparatus. This makes the hydraulic fluid transmission according to the first aspect of the invention particularly suitable for handling high instantaneous power flows efficiently.

Typically the controller is configured to control the continuous pressure control system (and typically to control the discretised pressure control system) such that a contribution of the second chambers (and typically thus the continuous pressure control system) to the said property of the actuator apparatus at least partially (typically continuously) compensates for a difference between a contribution of the said first chambers (and typically thus the discretised pressure control system) to the said property of the actuator apparatus and a value of the said property of the actuator apparatus indicated by a received demand.

Typically the said received demand is a smoothly varying function of the said property of the actuator apparatus. Typically the contribution of the said first chambers (and typically thus the discretised pressure control system) to the said property of the actuator apparatus comprises one or more steps. By compensating for a difference between a value of the said property of the actuator apparatus indicated by the received demand and a contribution of the said first chambers (and typically thus the discretised pressure control system) to the said property of the actuator apparatus, steps in the contribution of the said first chambers to the said property of the actuator apparatus can be effectively smoothed, thereby allowing the said property of the actuator apparatus to be more accurately regulated in accordance with the (typically smooth) received demand.

Typically the hydraulic transmission comprises more said first chambers than said second chambers. It may be that there are at least two (or at least three) first chambers per second chamber.

By providing more first chambers than second chambers, the efficiency of the hydraulic fluid power transmission is improved because discretised fluid transmissions typically transmit hydraulic fluid more efficiently than continuous fluid transmissions.

It may be that a single second chamber is provided.

It may be that more than one first chamber is (typically more than two first chambers, more typically more than three first chambers are) provided.

The said property of the actuator apparatus may be, for example, any of the following: a particular performance property (e.g. speed of movement or torque delivered to or by the actuator apparatus); an output torque; an output force; a speed of rotation; a speed of movement; an electrical power output; a power input or output; a linear or rotary displacement; a resistance to movement of an actuator shaft; a fluid pressure or rate of fluid flow to or from the actuator apparatus; or a force or pressure acting on or exerted by the actuator apparatus.

The said property of the actuator apparatus is typically an output property of the actuator apparatus.

The received demand is typically a demand for the said property of the actuator apparatus. Typically the received demand is a received signal indicative of a demanded (e.g. target) value of the said property of the actuator apparatus. For example, it may be that the received demand is: a received signal indicative of a demanded or target value of a performance property (e.g. speed of movement or torque delivered to or by the actuator apparatus) of the actuator apparatus; a received signal indicative of a demanded (e.g. target) value of an output torque of the actuator apparatus; a received signal indicative of demanded (e.g. target) value of an output force of the actuator apparatus; a received signal indicative of a demanded (e.g. target) value of a speed of rotation of the actuator apparatus; a received signal indicative of a demanded (e.g. target) value of a speed of movement of the actuator apparatus; a received signal indicative of a demanded (e.g. target) value of an electrical power output of the actuator apparatus; a received signal indicative of a demanded (e.g. target) value of a power input or output of the actuator apparatus; a received signal indicative of a demanded (e.g. target) value of a linear or rotary displacement of the actuator apparatus; a received signal indicative of a demanded (e.g. target) value of a resistance to movement of an actuator shaft of the actuator apparatus; a received signal indicative of a demanded (e.g. target) value of a fluid pressure or rate of fluid flow to or from the actuator apparatus; or a received signal indicative of a demanded (e.g. target) value of a force or pressure acting on or exerted by the actuator apparatus.

It may be that the received demand is derived from a manual control input from a user. Alternatively, it may be that the received demand is an automatically computer derived control input (e.g. a desired resistance of a hydraulic ram to movement of a buoyant body member of apparatus for extracting electrical power from water waves).

It may be that the received demand is a demand for a particular performance property (e.g. speed of movement or torque delivered to the actuator apparatus) of manually operated hydraulic machinery comprising the hydraulic transmission and the actuator apparatus.

It will be understood that the plurality of hydraulic sources and sinks may comprise one or more hydraulic fluid sources and one or more hydraulic fluid sinks. The plurality of hydraulic sources and sinks may comprise two or more hydraulic sources. The plurality of hydraulic sources and sinks may comprise two or more hydraulic fluid sinks.

Typically at least one or each second chamber has a load range greater than or equal to that of at least one or each said first chamber. Typically each second chamber may have a load range 10-20% greater than one or each said first chamber to ensure that the second chamber has enough load capacity to correct for steps in a real system with control hysteresis, pressure drops and other real system effects. It will be understood that the load range of the said second chamber is the range from the minimum contribution (e.g. a minimum pressurised fluid consumption or output) of the second chamber to meet the demand to the maximum contribution (e.g. a maximum pressurised fluid consumption or output) of the second chamber to meet the demand.

Typically the pressure of the hydraulic fluid input to or output from the second chambers is variable within a range of pressures between a first pressure and a second pressure. It may be that the discretised pressure control system is configured (e.g. programmed) to selectively connect one or more first chambers of the said plurality of chambers to one of a plurality of hydraulic fluid sources or sinks, the plurality of hydraulic fluid sources or sinks comprising a hydraulic fluid sink having a pressure equal to the said first pressure and a hydraulic fluid source having a pressure equal to the second pressure. However, it may of course be that the pressure ranges of the discretised and continuous pressure control systems are different. For example the difference between the first and second pressures may be greater than the pressure difference between the said hydraulic fluid source and sink.

It may be that the discretised pressure control system is configured to selectively connect the one or more first chambers to one of a plurality of hydraulic fluid sources or sinks to thereby selectively change the pressure(s) within the said first chamber(s) between discrete pressure values (the said discrete pressure values being determined by the pressures of the hydraulic fluid sources or sinks). Typically the discretised pressure control system is configured to selectively change the pressure(s) within the said first chamber(s) between discrete pressure values discretely with respect to time (i.e. non-continuously over time).

It may be that the continuous pressure control system is configured to control the pressure or flow rate of hydraulic fluid input to or output from one or more second chambers of the said plurality of chambers continuously with respect to time.

It may be that the continuous pressure control system comprises an electrical generator configured to convert rotation of a rotatable shaft (e.g. a rotatable shaft of a variable displacement pump-motor or of a pair of variable displacement pump-motors) of the continuous pressure control system into electricity (in order to take power out of the transmission) and/or a prime mover (e.g. electric motor or engine such as an internal combustion (e.g. diesel powered) engine) configured to provide power to the transmission (e.g. to allow the actuator apparatus to do work on a load).

It may be that the hydraulic transmission further comprises a variable displacement hydraulic motor configured to convert pressurised hydraulic fluid received from a high pressure hydraulic fluid store to rotation of a rotatable shaft, and an electrical generator driven by the said rotation of the rotatable shaft to generate electricity. Typically the said variable displacement hydraulic motor and electrical generator are separate from (i.e. not part of) the continuous pressure control system (although of course the motor may be in communication with a high pressure hydraulic fluid store and/or a hydraulic fluid reservoir to which the continuous pressure control system is also selectively connected).

It may be that the hydraulic transmission further comprises a prime mover (e.g. electric motor or engine such as an internal combustion engine) and a variable displacement hydraulic pump configured to convert rotation of a rotatable shaft of the prime mover to pressurised hydraulic fluid (which is typically provided to a high pressure hydraulic fluid store such as an accumulator). Typically the said prime mover and variable displacement hydraulic pump are separate from (i.e. not part of) the continuous pressure control system (although of course the pump may be in communication with a high pressure hydraulic fluid store and/or a hydraulic fluid reservoir to which the continuous pressure control system is also selectively connected).

By flow rate of hydraulic fluid input to or output from one or more second chambers of the said plurality of chambers, we typically mean the volume of hydraulic fluid flowing into or out of the said one or more second chambers per unit time. However, it will be understood that this flow rate may be delivered by (for example) controlling a volume of hydraulic fluid flow per cycle of rotation of a rotatable crankshaft (e.g. a rotatable crankshaft of one or more pump-motors of the continuous pressure control system, the pump-motors being operable to function as a motor or a pump in different operating modes).

It will be understood that the actuator apparatus typically comprises one or more coupled actuators. It will also be understood that the actuator apparatus may drive or be driven by a hydraulic fluid (or in some embodiments a mixture of these).

Typically the pressure or flow rate of the hydraulic fluid input to or output from the second chambers is variable within a continuous range of pressures or a continuous range of flow rates respectively.

Typically the continuous pressure control system is configured to continuously control the pressure or flow rate of hydraulic fluid input to or output from the said second chambers. It may be that the continuous pressure control system is configured to continuously vary the pressure or flow rate of hydraulic fluid input to or output from the second chambers such that a contribution of the second chambers to the said property at least partially (typically continuously) compensates for a difference between a value of the said property indicated by a or the received demand and a contribution of the said first chambers to the said property.

Typically the second chambers are different from the first chambers in the sense that none of the first chambers are second chambers and vice versa. It will be understood that one or more first chambers may be of identical construction to one or more second chambers.

Typically the controller is configured to control the discretised and continuous pressure control systems to thereby regulate a property of the actuator apparatus affected by the hydraulic fluid pressure in the said chambers to follow a or the received demand for the said property of the actuator apparatus.

Typically the controller is configured to generate a discretised demand and a continuous demand from the said received demand for the said property of the actuator apparatus, the controller being configured to control the discretised pressure control system to follow the discretised demand and to control the continuous pressure control system to follow the continuous demand.

Typically the discretised demand is determined by offsetting (i.e. applying an offset to) the received demand for the said property of the actuator apparatus (typically by a constant amount). Typically the discretised demand is determined by offsetting (i.e. applying an offset to) the received demand to determine an offset demand signal and then quantising the offset demand signal, the quantising typically taking into account the number of first chambers (and typically the direction in which they are configured to act).

It may be that the hydraulic fluid transmission comprises a single second chamber. It may be that the discretised demand is offset from the received demand in a direction opposite from that in which the second chamber is configured to act (i.e. to contribute to the output) to determine the offset demand.

Typically the discretised demand is determined by offsetting (i.e. applying an offset to) the received demand by half the load range available from an individual second chamber of the said second chamber(s).

By determining the discretised demand by offsetting (i.e. applying an offset to) the received demand (typically by half the load range available from an individual second chamber), a single second chamber acting in one direction only can be made to correct steps in the contribution of the first chambers to the demand. This is because the offset biases the continuous demand signal to always remain in the right sense for the second chamber to follow it.

This allows the number of second chambers to be minimised (e.g. a single second chamber can be provided), which thereby helps to increase the efficiency of the transmission as a whole and reducing its cost.

Alternatively, it may be that a plurality of second chambers are provided, at least two of the said second chambers being operable to act in opposition to each other. In this case, it is not necessary to offset the discretised demand from the received demand. However, as the number of second chambers is increased, the efficiency of the transmission as a whole may be reduced and the cost may increase.

It may be that two or more (or three or more) said first chambers are connected in parallel. It may be that two or more (or three or more) said first chambers are connected in series.

It may that two or more (or three or more) said second chambers are connected in parallel. It may be that two or more (or three or more) said second chambers are connected in series.

Typically the hydraulic fluid transmission comprises one or more pressure sensors configured to measure the pressure in each of the first chambers, the said pressure sensors being in (typically electronic) communication with the controller. Typically the hydraulic fluid transmission comprises one or more pressure sensors configured to measure the pressure in each of the second chambers, the said pressure sensors being in (typically electronic) communication with the controller.

Typically the hydraulic fluid transmission comprises one or more pressure sensors configured to measure the pressure in each of the said hydraulic fluid sources and/or each of the said hydraulic fluid sinks, each of the said pressure sensors being in (typically electronic) communication with the controller.

Typically the said hydraulic fluid sources or sinks comprise one or more high pressure hydraulic fluid sources or sinks and one or more low pressure hydraulic fluid sources or sinks, the high pressure hydraulic fluid sources or sinks having greater hydraulic pressures than the low pressure hydraulic fluid sources or sinks.

Typically the controller is configured to determine the continuous demand by: determining an output from the said first chambers by identifying one or more first chambers selectively connected to a high pressure hydraulic fluid source or sink; measuring the pressures in each of the said identified first chambers (typically by receiving pressure measurement signals from pressure sensors in the said chambers); and deriving the continuous demand from the determined pressures in the said first chambers and the said received demand for the said property of the said actuator apparatus.

Typically the continuous pressure control system is configured to take into account one or more physical properties of the actuator apparatus to determine a flow rate or pressure of hydraulic fluid delivered to or received from the said one or more said second chambers. For example, the said physical properties may include any one or more of: a speed of movement of one or more pistons of the actuator apparatus; volume(s) of the said one or more second chambers; and a rate of change of volume of the said one or more chambers. The continuous pressure control system is typically configured to take into account one or more properties of the hydraulic working fluid within the second chamber(s), such as the fluid stiffness, to determine a flow rate or pressure of hydraulic fluid delivered to or received from the said one or more said second chambers.

Typically the continuous pressure control system is configured to adjust a flow rate or pressure of hydraulic fluid delivered to or received from the said one or more said second chambers to reduce an error between a measured pressure (e.g. by one or more pressure sensors configured to measure the pressure in the said second chamber) in the said second chamber(s) and the continuous demand (typically taking into account one or more physical properties of the actuator apparatus as discussed above).

Typically the continuous pressure control system comprises one or more variable displacement pump/motors operable to operate as a pump or as a motor in different operating modes.

Typically the continuous pressure control system comprises a variable displacement pump/motor (operable to operate as a pump or as a motor in different operating modes) in a common shaft arrangement with another unit exchanging hydraulic fluid with a high pressure hydraulic fluid source. Typically the said another unit comprises a second variable displacement pump/motor (operable to operate as a pump or as a motor in different operating modes).

Typically the variable displacement pump/motor(s) is (are) under active computer programmed control (typically by the said controller).

Optionally the variable displacement pump/motor(s) is (are) a (synthetically commutated) variable displacement pump/motor(s), typically each comprising at least one working chamber of cyclically varying volume (typically a plurality of working chambers of cyclically varying volume), a high pressure manifold, a low pressure manifold and a plurality of valves which regulate the flow of fluid between the at least one working chamber and the low and high pressure manifolds. Typically at least one valve associated with the or each working chamber is an electronically controlled valve operable in phased relationship to cycles of working chamber volume to select the net volume of working fluid displaced by the respective working chamber during each successive cycle of working chamber volume.

Typically the discretised pressure control system comprises a plurality of electronically controllable valves which regulate the flow of fluid between each said first chamber and one of the said hydraulic sinks or sources. Each said valve is typically operable between an open position in which hydraulic fluid can flow between a said first chamber and a hydraulic fluid source or sink and a closed position in which there is no hydraulic fluid flow through the valve.

It may be that the common shaft is coupled to a prime mover or energy sink, and wherein the controller is configured to control the net shaft torque to provide a smoothed net power transfer between the common shaft and the prime mover or energy sink.

It may be that the continuous pressure control system comprises one or more variable flow control valves each of which is configured to regulate the flow of hydraulic fluid between a said second chamber and a respective one of a plurality of hydraulic fluid sources or sinks.

Typically the continuous pressure control system is configured to control the pressure or flow rate of hydraulic fluid into or out of a said second chamber responsive to a (typically externally driven) change of volume of that chamber (e.g. to directly match the change in volume of that chamber).

Typically the continuous pressure control system is configured to control the flow rate or pressure of hydraulic fluid into or out of a said second chamber to cause a desired change in pressure taking into account the volume of the said second chamber. Typically the continuous pressure control system is configured to control the flow rate or pressure of hydraulic fluid into or out of a said second chamber to cause a desired change in pressure taking into account an effective bulk modulus of the fluid volume.

Typically the controller is configured to synchronise a change in pressure of a said second chamber with a corresponding change in pressure in one or more said first chambers.

Typically the fluid driving surfaces of the said chambers are coupled to each other such that the forces exerted by hydraulic fluid on the respective fluid driving surfaces of the chambers are additive or subtractive.

Typically the discretised pressure control system comprises one or more inlet valves configured to selectively connect a said first chamber to a hydraulic fluid source, and/or one or more outlet valves configured to selectively connect a or the said first chamber to a hydraulic fluid sink.

It may be that the one or more inlet valves comprise a pair of inlet valves connected in parallel with each other.

It may be that the one or more outlet valves comprise a pair of outlet valves connected in parallel with each other.

Typically a first one of the valves in each pair permits a greater hydraulic fluid flow rate therethrough than a second one of the valves in that pair.

Typically the second one of the said valves transitions from a closed state in which no hydraulic fluid flows therethrough to an open state in which hydraulic fluid flows therethrough (typically at a maximum hydraulic fluid flow rate for the valve) more quickly than the first one of the said valves.

Typically the controller is configured to open the said second one of the valves before opening the said first one of the valves in order to change the pressure in one or more first chambers.

The second one of the said pair of valves controls the timing and transition profile of the transition of the first chamber between connection to a hydraulic fluid source and a hydraulic fluid sink or vice versa. That is, the second one of the said pair of valves controls the timing and transition profile of the transition of the first chamber between relatively low and high pressure states. Thus, the timing and profile of the said transition can be controlled (e.g. slowed) to permit a pressure change in the said second chamber(s) to synchronise with a pressure change in the first chambers.

The invention extends in a second aspect to apparatus for extracting electrical power from a renewable energy source comprising a hydraulic fluid transmission according to the first aspect of the invention. In this case, the renewable energy source is typically configured to drive the actuator apparatus. Typically the said property of the actuator apparatus is a property of the actuator apparatus which affects the resistance of the actuator apparatus to movement caused by the renewable energy source. For example, the said property may be an actuator pressure.

The invention also extends in a third aspect to apparatus for extracting electrical power from water waves comprising a hydraulic fluid transmission according to the first aspect of the invention.

Typically the apparatus comprises one or more pairs of buoyant body members connected to each other by a coupling which permits relative rotation between the body members. The apparatus typically comprises a power extraction system comprising the said actuator apparatus, the said actuator apparatus having one or more coupled actuators each having a first end coupled to a first body member of the said pair of body members and a second end coupled a second body member of the said pair of body members such that the actuator(s) resists and extracts power from the relative rotation between the body members.

The invention extends in a fourth aspect to a heave compensation winch comprising a hydraulic fluid transmission according to the first aspect of the invention.

In this case, the hydraulic fluid transmission is typically configured to convert stored hydraulic pressure and/or shaft power from a prime mover (such as an electric motor) into a varying load on a cable which varies the speed of the winding in and out of the cable. The said property of the actuator apparatus in this case is typically the load on the said cable or the speed of the winding in and out of the cable.

A fifth aspect of the invention provides a method of transmitting hydraulic fluid power, the method comprising: providing an actuator apparatus having a plurality of chambers, each of the chambers having a respective fluid driving surface configured to drive or be driven by hydraulic fluid therein; selectively connecting said one or more first chambers to one of a plurality of hydraulic fluid sources or sinks, at least two of the said plurality of hydraulic fluid sources or sinks having different fluid pressures; and controlling the pressure or flow rate of hydraulic fluid input to or output from said one or more second chambers of the said plurality of chambers by varying the pressure or flow rate of hydraulic fluid flowing into or out of the said second chambers within a range of pressures or flow rates respectively to thereby regulate a property of the actuator apparatus affected by the hydraulic fluid pressure in the said chambers.

The method may further comprise controlling the pressure or flow rate of hydraulic fluid input to or output from said one or more second chambers by varying the pressure or flow rate of hydraulic fluid flowing into or out of the said second chambers within a range of pressures or flow rates respectively such that a contribution of the second chambers (and typically thus the continuous pressure control system) to the said property of the actuator apparatus at least partially (typically continuously) compensates for a difference between a contribution of the said first chambers to the said property of the actuator apparatus and a value of the said property of the actuator apparatus indicated by a received demand.

The preferred and optional features discussed above in respect of any aspect of the invention are preferred and optional features of each aspect of the invention.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
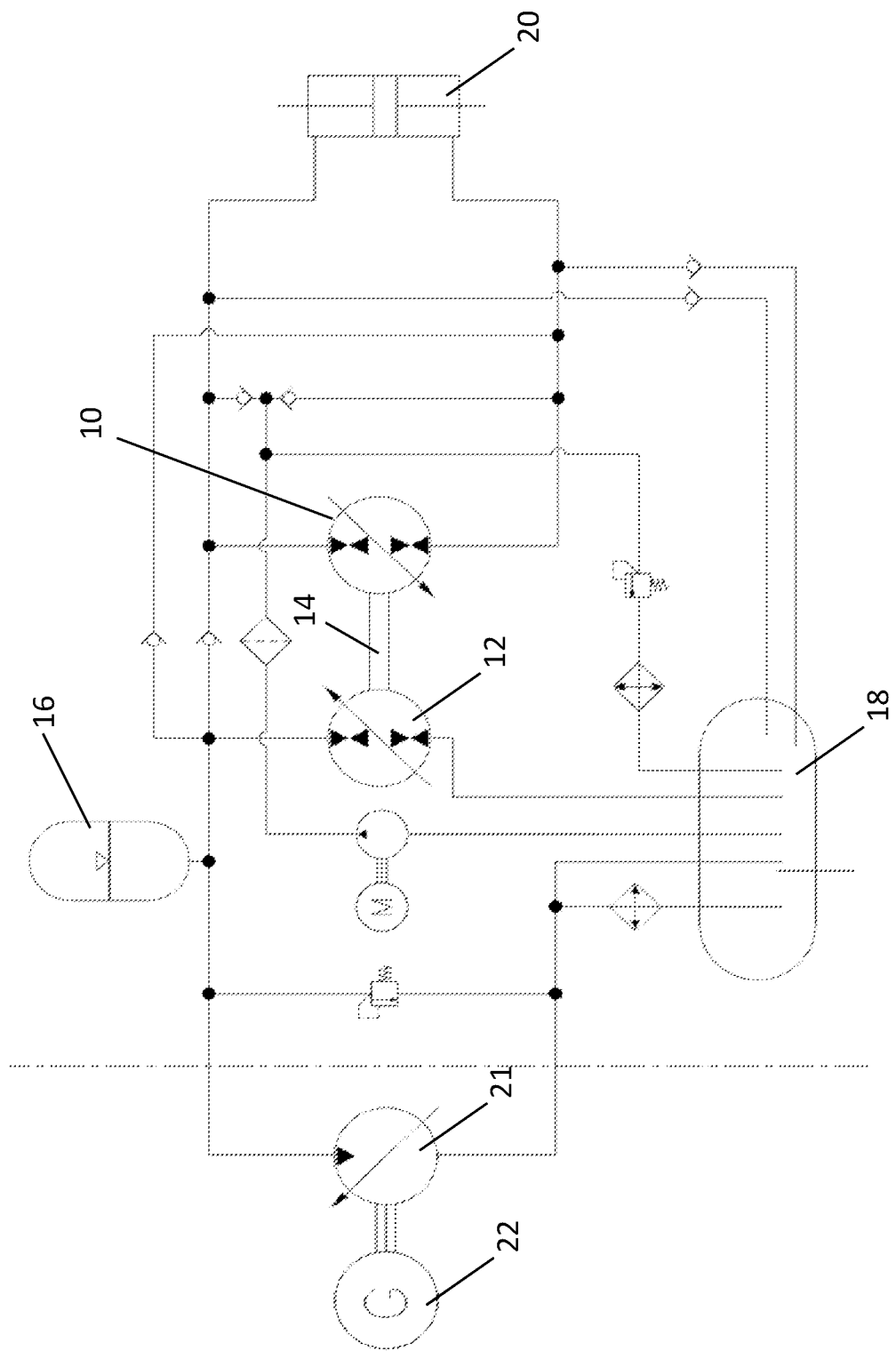
FIG. 1 is a schematic hydraulic circuit diagram of a hydraulic transmission which uses continuous pressure control enabled by a pair of variable displacement pump-motors on a common shaft.
Figure 2:
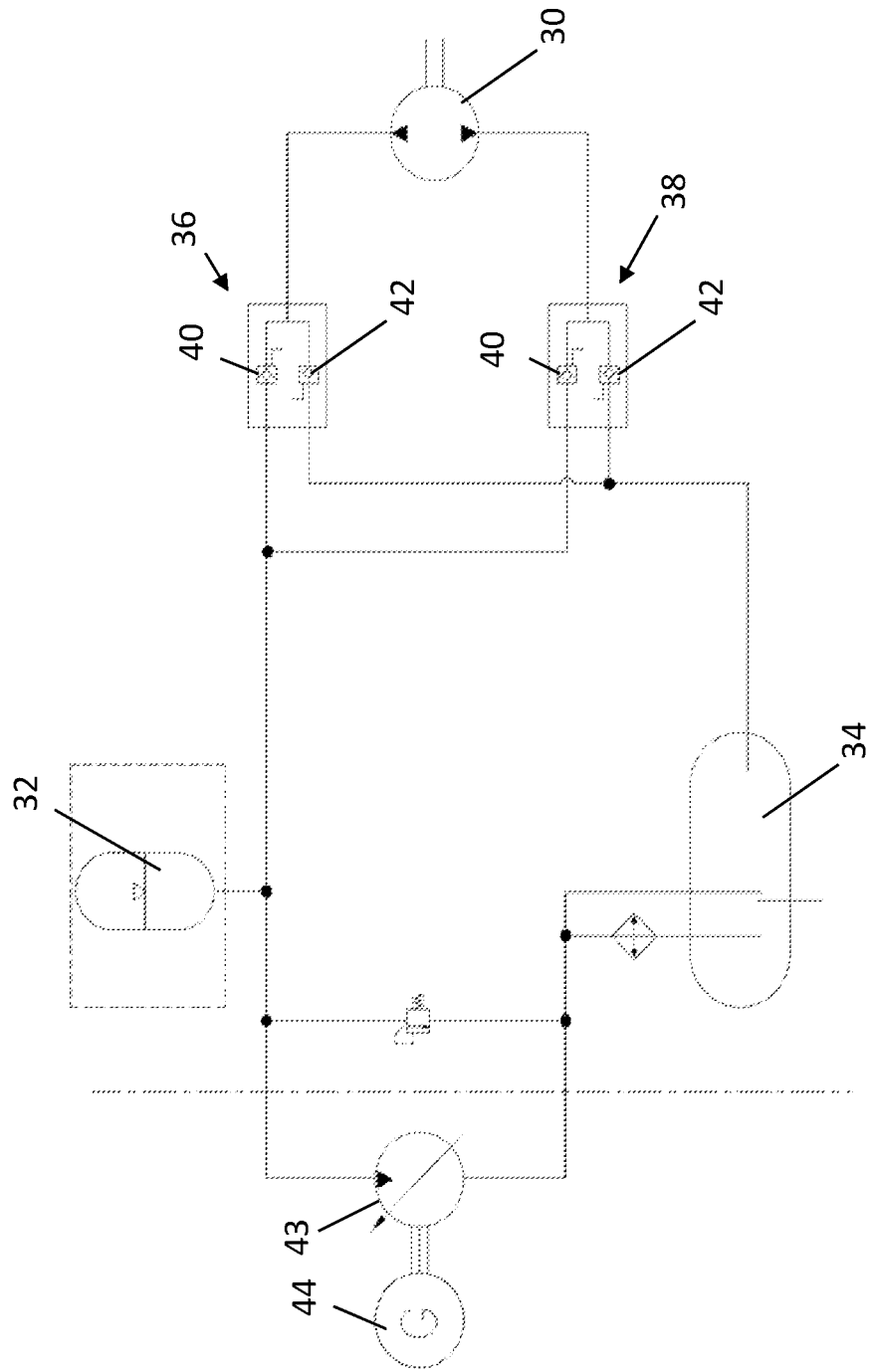
FIG. 2 is a schematic hydraulic circuit diagram of a hydraulic transmission which uses quantised pressure control enabled by two pairs of electronically controlled valves configured to selectively connect each of a pair of actuator chambers to a high pressure energy store and a low pressure reservoir.
Figure 3:
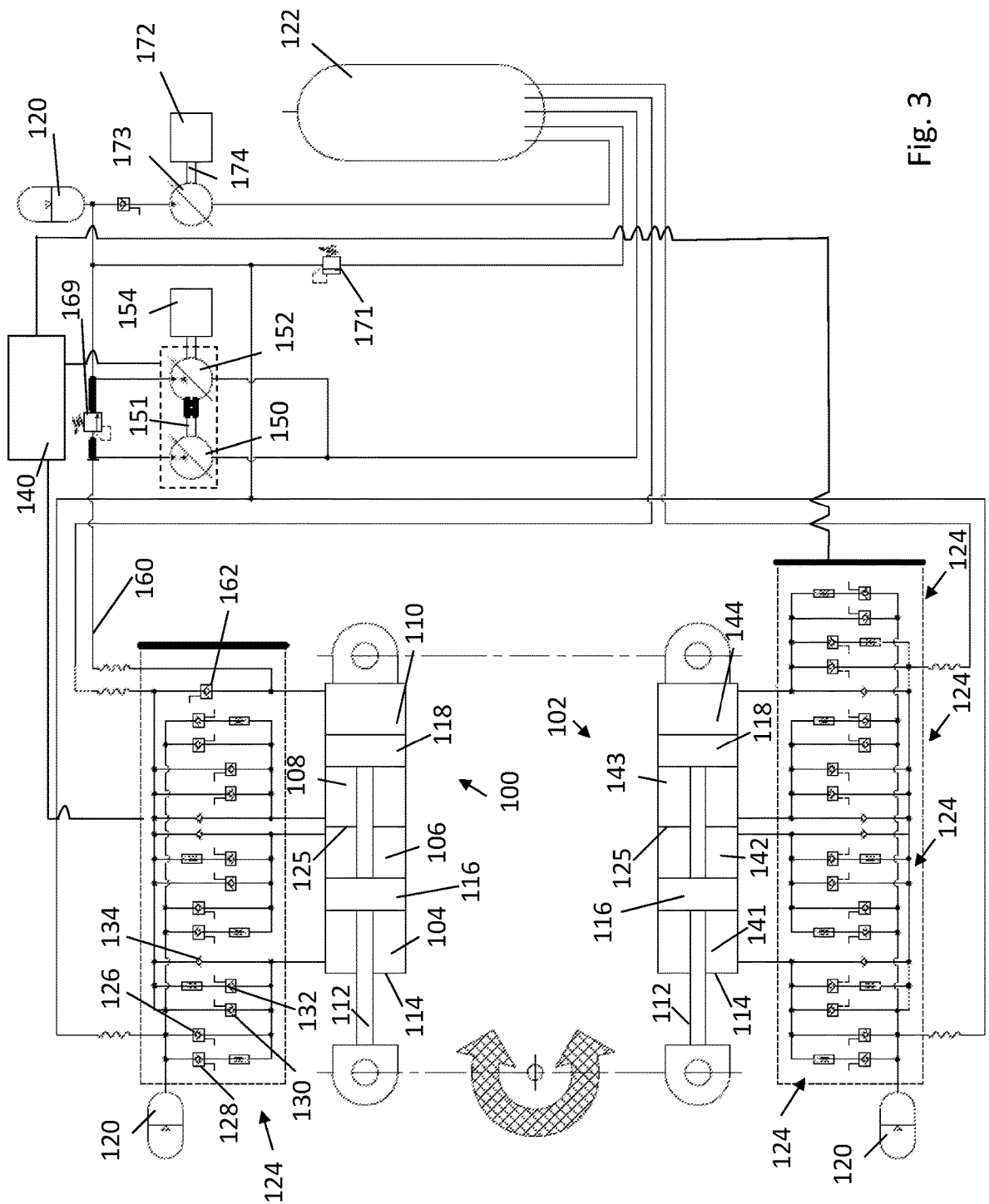
FIG. 3 is a schematic hydraulic circuit diagram of a hybrid hydraulic transmission having a pair of actuators each with four hydraulic fluid chambers acting about a pivot to allow torque and power to be transmitted about it, the pressure of all four chambers of one actuator and the pressure of three of the other being controlled by a discretised pressure control system and the pressure within the remaining actuator of the said other actuator being controlled by a continuous pressure control system.

FIG. 3 is a schematic hydraulic circuit diagram of a hybrid hydraulic fluid transmission comprising first and second linear hydraulic actuators 100, 102 acting about a pivot to allow torque and power to be transmitted about it, the first and second actuators 100, 102 each having four actuator chambers 104, 106, 108, 110 and 141, 142, 143, 144 respectively. The hydraulic actuators 100, 102 are hydraulic rams of apparatus for extracting energy from water waves, the actuators 100, 102 being driven by the relative rotation of buoyant body members (not shown) provided in a body of water (e.g. an ocean), the relative rotation being caused by waves in the body of water, the buoyant body members being coupled to each other by a coupling which permits relative rotation between the body members and which causes movement within each of the actuators 100, 102 of a shaft into and out of a cylinder 114, thereby causing first and second pistons 116, 118 provided on the shaft 112 to reciprocate in the cylinder 114 to perform work. The pistons 116, 118 of the actuators 100, 102 each have opposing respective fluid driving surfaces configured to drive or be driven by hydraulic fluid in the respective chambers 104-110 (in respect of the first actuator 100), 141-144 (in respect of the second actuator 102). A divider 125 is provided between the pistons 116, 118 of each actuator 100, 102 so that the pistons 116, 118 of each actuator 100, 102 operate in series with each other. Chambers 104, 106 are provided on either side of the first piston 116 of the first actuator 100, while chambers 108, 110 are provided on either side of the second piston 118 of the first actuator 100. Chambers 141, 142 are provided on either side of the first piston 116 of the second actuator 102, while chambers 143, 144 are provided on either side of the second piston 118 of the second actuator 102. The pressures in the chambers 104-110, 141-144 are controlled in order to control the resistance of the movement of the pistons 116, 118 with the cylinder 114 of each actuator 100, 102, in order to maximise the energy extracted by the hydraulic rams.

Three chambers 104, 106 and 108 of the first actuator 100 and all four chambers 141-144 of the second actuator 102 (hereinafter referred to as first chambers) are selectively connected to a high pressure hydraulic fluid accumulator 120 and a low pressure hydraulic fluid reservoir 122 by way of respective hydraulic fluid lines and respective banks 124 of electronically controlled valves coupled between the respective chambers 104-108, 141-144 and the accumulator 120 and the reservoir 122. The banks 124 thus operate as a discretised pressure control system. Each of the banks 124 of electronically controlled valves are identical, so only the bank 124 coupled between the chamber 104 of the first actuator 100 and the accumulator 120 and reservoir 122 is described below for brevity.

The bank 124 comprises first and second electronically controlled high pressure valves 126, 128 arranged in parallel and configured to selectively connect the chamber 104 to the accumulator 120. Each of the high pressure valves 126, 128 have open states in which hydraulic fluid can flow through them between the chamber 104 and the accumulator 120 and closed states in which hydraulic fluid cannot flow through them between the chamber 104 and the accumulator 120. The first high pressure valve 126 has a greater fluid flow area therethrough when it is in its open state than the second high pressure valve 128. This is illustrated in FIG. 3 by way of a hydraulic impedance in series with the second high pressure valve 128. The second high pressure valve 128 (e.g. by virtue of having a valve member with a smaller cross sectional area than that of the first high pressure valve 126) is capable of transitioning between its open and closed states more quickly than the first high pressure valve 126, but the maximum fluid flow rate through the second high pressure valve 128 (when open) is less than the maximum fluid flow rate through the first high pressure valve 126 (when open).

The bank 124 further comprises first and second electronically controlled low pressure valves 130, 132 arranged in parallel and configured to selectively connect the chamber 104 to the reservoir 122. The first low pressure valve 130 has a greater fluid flow area therethrough when it is in its open state than the second low pressure valve 132. This is illustrated in FIG. 3 by way of a hydraulic impedance in series with the second high pressure valve 132. The second low pressure valve 132 (e.g. by virtue of having a valve member with a smaller cross sectional area than that of the first low pressure valve 130) is capable of transitioning between its open and closed states more quickly than the first low pressure valve 130, but the maximum fluid flow rate through the second low pressure valve 132 (when open) is less than the maximum fluid flow rate through the first low pressure valve 130 (when open).

The bank 124 further comprises a large cross sectional flow area low pressure check valve 134 operable to selectively connect the chamber 104 to the low pressure reservoir 122 in order to maintain the pressure in the chamber 104 at least at the pressure in the low pressure reservoir (which may be charged above atmospheric pressure), for example when the chamber 104 is increasing in volume (by movement of the shaft 112 and the piston 116), to prevent cavitation. The check valve 134 is configured to open when the pressure in the chamber 104 falls below the pressure of the reservoir 122.

The valves of the bank 124 control the timing and the transition profiles (i.e. the way in which the pressure changes over time) of the chamber 104 between a high pressure state, when it is connected to the accumulator 120, and a low pressure state when it is connected to the reservoir 122. More specifically, the second low or high pressure valves 128, 132 open first, to begin the pressure transition gradually. When the pressure transition is underway, the first low or high pressure valves 128, 132 are opened to allow the full rate of hydraulic fluid flow through the combination of first and second low or high pressure valves, to thereby complete the pressure transition. This prevents extremely quick large pressure transitions from occurring, which could cause a shock to the system. In addition, the timing profiles of the transitions are typically controlled to permit a pressure change in chamber 110 to synchronise with a pressure change in one or more of the first chambers 104-108, 141-144 and to optimise the performance and accuracy of the overall system. Typically in practice the timing profiles of the transitions of the chamber 104 between the low and high pressure states ensures that the control latency of the chamber 104 is greater than the control latency of the chamber 110.

The valves of the banks 124 are typically electronically controlled solenoid valves which are controlled by a controller 140 provided in electronic communication with the valves. The controller 140 acts to selectively open and close the valves by turning a solenoid on and off, the valves being biased to the open or closed positions by a (typically passive) biasing mechanism such as a spring. The banks 124 of low and high pressure valves are thus part of a discretised control system under the control of the controller 140 which is configured to selectively connect the first chambers 104-108, 141-144 to the accumulator 120 and the reservoir 122. The controller typically comprises one or more computer processors configured to run computer program code. It may be that the controller 140 is distributed across a plurality of processors.

As explained in the Background of invention, use of this discretised control method alone leads to an undesirable stepped output.

Chamber 110 (which will be referred to as a second chamber hereinafter) is connected to a continuous pressure control system comprising a first variable displacement hydraulic pump-motor 150 coupled to a second variable displacement hydraulic pump-motor 152 by a common shaft 151, the variable displacement hydraulic pump-motors 150, 152 each being operable to function as a pump or a motor in different operating modes. The variable displacement hydraulic pump-motors 150, 152 are also coupled to an electricity generator 154 by way of the common shaft 151 (which is operable to drive the generator 154). Connection between the chamber 110 and the continuous pressure control system is by way of a hydraulic line 160, and the chamber 110 is also selectively connected to the low pressure reservoir 122 by an electronically controlled valve 162 which is controlled by, and in electronic communication with, the controller 140. Valve 162 will either open passively in the event that the pressure in the chamber 110 falls below the pressure in the reservoir 122 (to prevent cavitation) or actively on the command of the controller 140 to disable flow from the pump-motors 150,152 into or out of the chamber 110.

Depending on the pressure requirements in the second chamber 110, one of the first and second variable displacement hydraulic pump-motors 150, 152 operates in a motoring mode to convert high pressure fluid (received from the chamber 110 or from the accumulator 120) to torque on the shaft 151 and output low pressure fluid to the reservoir 122. The other of the first and second variable displacement hydraulic pump-motors 150, 152 operates in pumping mode to convert torque of the shaft to pressurised fluid which is either provided to the accumulator 120 or to the chamber 110. The displacements of the hydraulic pump-motors 150, 152 can be varied in each case to consume or provide hydraulic fluid from or to the second chamber 110 having a pressure which is variable across a (typically continuous) range.

It will be understood that if the continuous pressure control system is required to consume high pressure fluid from the chamber 110, the first variable displacement hydraulic pump-motor 150 functions in the motoring mode, converting high pressure fluid from the chamber 110 to a torque on the shaft 151. The second variable displacement hydraulic pump-motor operates in pumping mode, converting torque from the shaft 151 to high pressure fluid provided to the accumulator. In addition, some of the torque on the shaft 151 is converted to electricity by the generator 154. This helps to reduce the number of rotating machines required to generate power, thereby improving efficiency of power generation. The pump-motors 150, 152 also provide an efficient means for starting and speed control of the shaft. The quantity of high pressure fluid consumed can be controlled by adjusting the displacements of the hydraulic pump-motors 150, 152.

If the continuous pressure control system is required to provide high pressure fluid to the chamber 110, the second variable displacement hydraulic pump-motor 152 functions in motoring mode, converting high pressure hydraulic fluid from the accumulator 120 to torque on the shaft 151. In this case, the first variable displacement hydraulic pump-motor 150 functions in pumping mode, converting torque on the shaft 151 to pressurised hydraulic fluid provided to the chamber 110. The quantity of high pressure fluid provided can be controlled by adjusting the displacements of the hydraulic pump-motors 150, 152.

In practice, the pressure in the second chamber 110 is controlled by the pump-motors 150, 152 demanding a little less or more than the flow required to match the 'geometric flow' that the chamber 110 is providing or absorbing as a result of the motion of the actuator shaft 112. The 'geometric flow' is the flow required to maintain a constant pressure in the chamber 110, taking into account increases or decreases in the volume of the chamber 110 as a result of motion of the actuator shaft 112. If the pump-motors 150, 152 are absorbing flow from the chamber 110, and if they absorb a little less flow than the 'geometric flow' being generated, the pressure in the chamber 110 will rise. Conversely if the pump-motors 150, 152 absorb a little more than the geometric flow, the pressure in the second chamber 110 will fall. In the inverse case where the actuator 100 is absorbing flow from the pump-motors 150, 152, if the pump-motors 150, 152 provide greater flow to the chamber 110 than the 'geometric flow' required, the pressure in the chamber 110 will rise. If the pump-motors 150, 152 provide less than the geometric flow, the pressure in the chamber 110 will fall. If the actuator is stationary, there is no 'geometric flow' of course and the pump-motors 150, 152 only need to deliver a small flow to pressurise the chamber 110 accordingly. It is through this mechanism that the pump-motors 150, 152 can deliver continuous pressure control over the chamber 110, and thereby continuous load control.

In one example, the variable displacement pump-motors 150, 152 comprise (synthetically commutated) variable displacement pump/motor(s), each comprising at least one working chamber of cyclically varying volume (typically a plurality of working chambers of cyclically varying volume), a high pressure manifold, a low pressure manifold and a plurality of valves which regulate the flow of fluid between the at least one working chamber and the low and high pressure manifolds, at least one valve associated with the or each working chamber being an electronically controlled valve operable in phased relationship to cycles of working chamber volume to select the net volume of working fluid displaced by the respective working chamber during each successive cycle of working chamber volume. The quantity of pressurised fluid consumed or provided by the continuous pressure control system can be varied by the controller 140 by activating and deactivating working chambers of the pump-motors 150, 152 on each cycle of working chamber volume (by way of controlling opening and closing of respective valves of the pump-motors).

Figure 8:
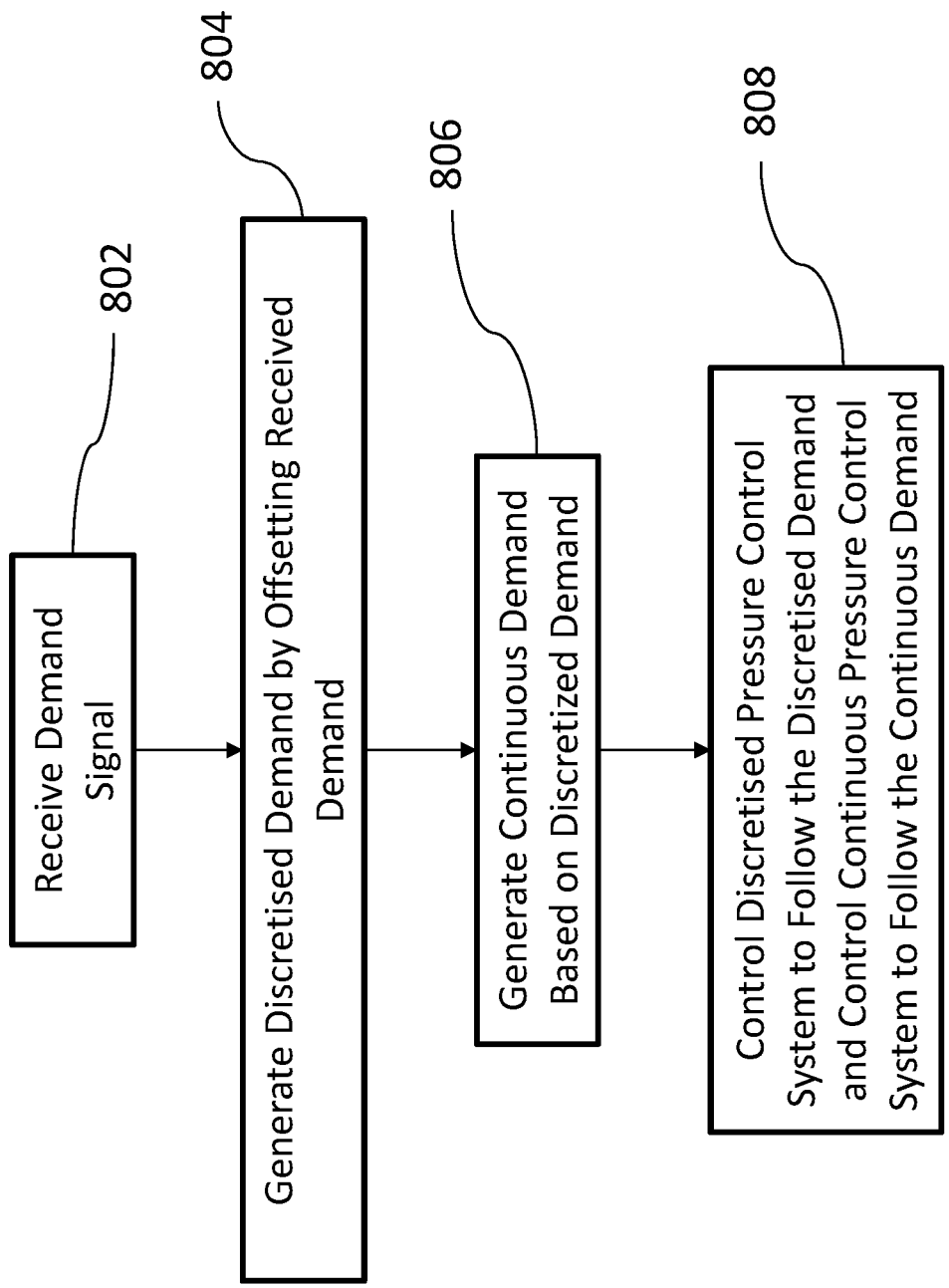
FIG. 8 is a flow chart showing a method for controlling the discretised pressure control system and the continuous pressure control system.

FIG. 8 is a flow chart showing a method for controlling the discretised pressure control system and the continuous pressure control system. The desired resistance of the actuator 100 to movement of the shaft 112 caused by relative rotation of the buoyant body members is provided to the controller 140 in the form of a computer derived load demand signal (functioning as the received demand) to be received 802 at the controller 140. The first chambers 104-108, 141-144 and the second chamber 110 work to meet the load demand. As will be explained below, the contribution of the second chamber 110 (and thus the continuous pressure control system) to meet the load demand can be selected to at least partially (preferably fully) compensate for a difference between the received demand and a contribution of the first chambers 104-108, 141-144 (and thus the discretised pressure control system) to meet the load demand, thereby significantly reducing (preferably removing) the steps in the resistance profile caused by the contribution of the first chambers 104-108, 141-144 (and thus the discretised pressure control system).

Figure 6:
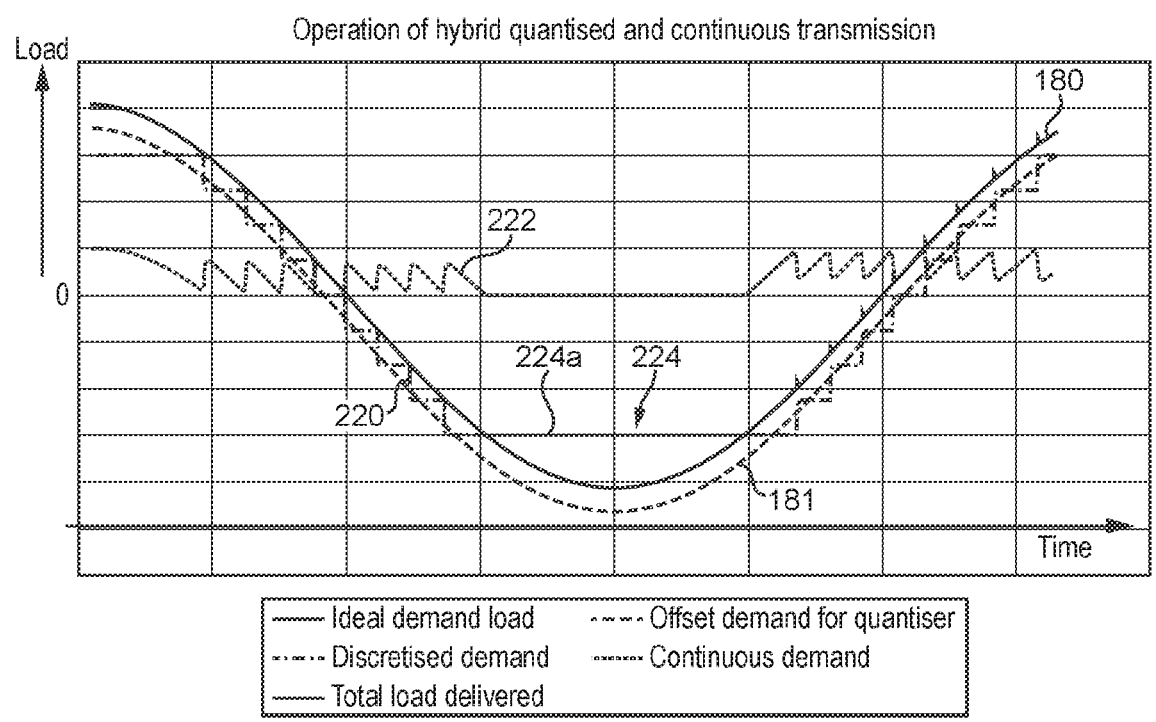
FIG. 6 is a graph showing the various demand and output signals from example quantized and continuous pressure control systems.

As shown in FIG. 6, the demand 180 received 802 by the controller is a smooth curve. The controller 140 is configured to generate 804 from the demand signal 180 a discretised load demand 220 (also shown in FIG. 6), the discretised demand 220 being the portion of the demand to which the first chambers 104-108, 141-144 are required to meet. The controller 140 is configured to cause 808 the first chambers 104, 141-144 to meet the discretised demand 220 as best they can such that the first chambers 104-108, 141-144 provide the main load and power flow. The difference or error between the load delivered by the first chambers 104-108, 141-144 and the received demand 180 forms 806 a continuous demand 222 for the second chamber 110 to deliver 808.

In this example the (single) second chamber 110 is operable to provide a force in only one direction (to the left in the view of FIG. 3). A single second chamber 110 acting in one direction only can be made to correct the steps in the discrete system by generating the discretised demand 220 by: offsetting 804 (i.e. applying an offset to) the received demand 180 by (typically) half of the load range of the second chamber 110 (the load range of the second chamber being the range from the minimum contribution of the second chamber 110 to meet the demand to the maximum contribution of the second chamber 110 to meet the demand) in a direction opposite to that in which the second chamber 110 is configured to provide an active force to generate an offset demand 181; and then quantising the offset demand 181 to generate the discretised demand 220. This biases the correction signal to always remain in the right sense for the second chamber 110 to correct it. To further clarify, this approach and effect is illustrated clearly in FIG. 6. The received demand signal 180 is offset down by half of the range of the second chamber which can be seen from the maximum and minimum range of the continuous demand 222. This means that (in this example) the continuous demand 222 inherently remains positive and within the load range that can be applied by the second chamber 110.

For alternative embodiments in which the actuator 100 is a rotary actuator, the direction of fluid flow into and out of the actuator chambers could be reversed as required as an alternative to the above approach.

It will be understood that if at least one second chamber 110 (i.e. at least one chamber in respect of which hydraulic fluid provided thereto or consumed therefrom having a continuously controlled pressure) is provided which is operable to provide a force in one direction and at least one second chamber 110 is provided which is operable to provide a force in the opposite direction, it would not be necessary to offset the discretised demand from the received demand as the continuous pressure controlled chambers could act to compensate for errors between the discrete pressure controlled chambers 104-108, 141-144 in either direction.

If there is relative clockwise motion of the buoyant body members around the pivot axis shown in FIG. 3 (between the ends of the double headed arrow between actuators 100, 102), the first actuator 100 will retract (the shaft 112 of the first actuator 100 moves to the right in the view of FIG. 3) and the second actuator will extend (the shaft 112 of the second actuator 102 moves to the left in the view of FIG. 3). In this case, the volumes of the first chambers 104, 108 of the first actuator 100 will increase and the volumes of the first chamber 106 and the second chamber 110 of the first actuator 100 will decrease. The volumes of the first chambers 141, 143 of the second actuator 102 will increase and the volumes of the first chambers 142, 144 of the second actuator 102 will decrease. The opposite is of course true if there is relative anticlockwise motion of the buoyant body members. In either case, as the shafts 112 of the first and second actuators 100, 102 move, the controller 140 controls the states of the high and low pressure valves in the valve blocks 124 associated with each first chamber 104-108, 141-144 to select the pressure of each first chamber 104-108, 141-144 as low or high (by selectively connecting them to the reservoir 122 or accumulator 120 respectively) to meet the discretised demand 220. Pressure within each of the first chambers 104-108, 141-144 can be controlled to either resist or assist movement of the shafts 112 of the actuators 100, 102 caused by the relative rotation of the buoyant body members, although it will be understood that the overall aim is that the relative rotation causes a net flow to the accumulator 120 (and to enable power to be extracted from the system).

The pressure within the second chamber 110 is also controlled by controlling the pressure and/or volume of working fluid flowing into the chamber 110 from the pump-motors 150, 152. However, as explained above, while the pressure within the first chambers 104-108, 141-144 is restricted to either the pressure of the accumulator 120 or the pressure of the reservoir 122, the pressure within the second chamber 110 is controllable within a continuous range of values by the pump-motors 150, 152. This property can be used to smooth the steps in the output provided by the first chambers 104-108, 141-144, to thereby improve the quality of the output as a whole, while retaining much of the benefits (e.g. improved efficiency) of the discrete pressure control system of the first chambers 104-108, 141-144.

Figure 4:
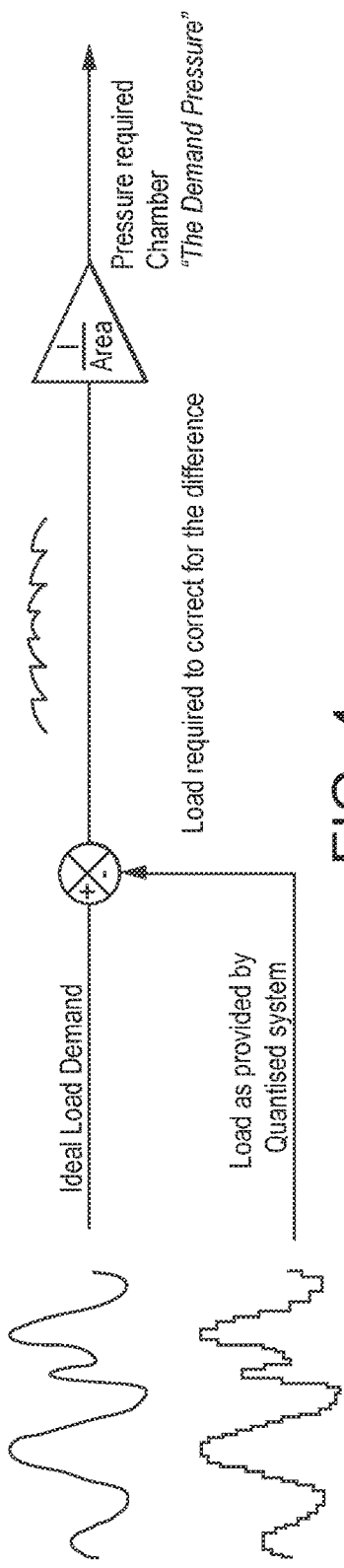
FIG. 4 is a block diagram of an algorithm for calculating a demand to be met by the continuous pressure control system of FIG. 3.

In order to calculate a continuous demand 222 to smooth the steps in the output provided by the first chambers 104-108, 141-144, the controller 140 is configured to receive pressure measurement signals from pressure sensors within the first chambers 104-108, 141-144, identify which of the chambers 104-108, 141-144 contributes to the demand and derive the continuous demand 222 from the received pressure measurements and the said identification. As illustrated in FIG. 4, the continuous demand 222 is typically derived by subtracting the measured (stepped) contributions of the chambers 104-108, 141-144 from the received load demand, taking into account the area of the relevant fluid driving surface of piston 118 of the first actuator 100.

Figure 5:
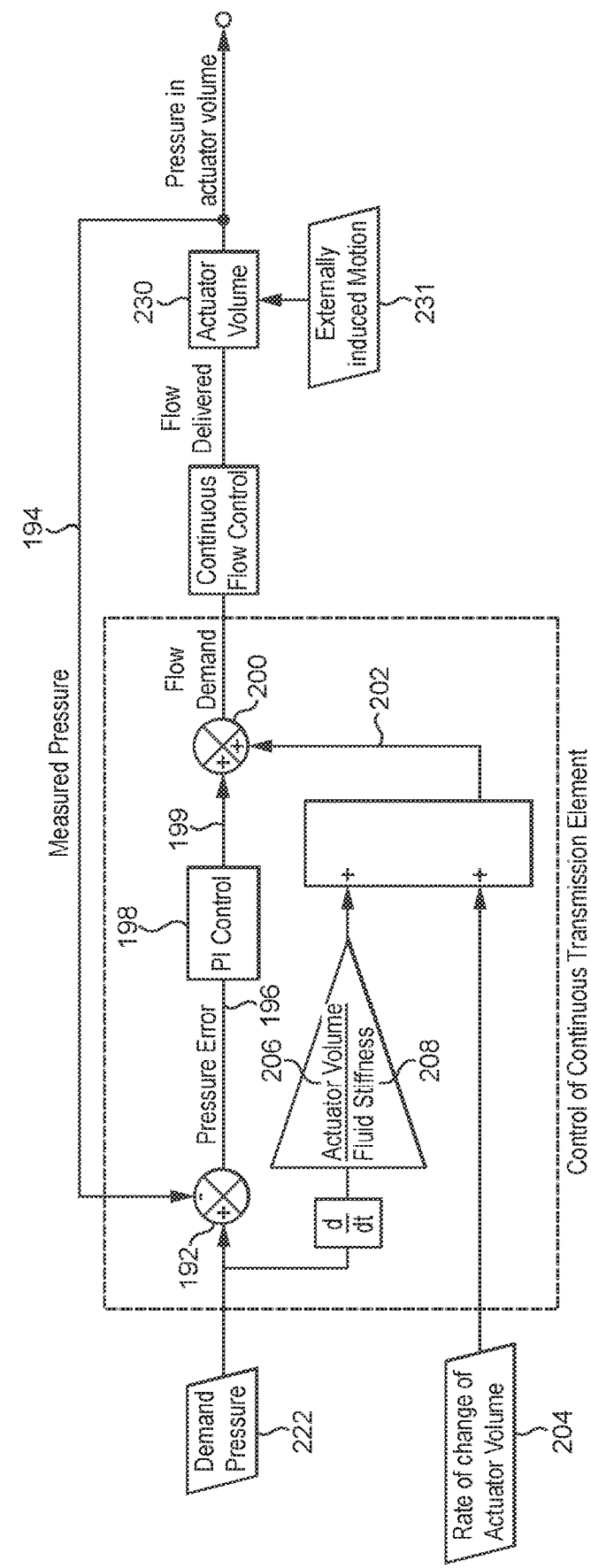
FIG. 5 is a block diagram of an algorithm implemented by the continuous pressure control system to meet the demand calculated by the algorithm of FIG. 4.

FIG. 5 is a block diagram of an example algorithm implemented by the controller 140 to control the continuous pressure control system (and thus the pressure in the second chamber 110) to meet the continuous demand 222. The algorithm receives the continuous pressure demand 222 as an input to a difference operator 192 which also receives as another input the measured pressure 194 in the second chamber 110 (typically measured by a pressure sensor configured to measure the pressure in the second chamber 110, the pressure sensor 110 being in electronic communication with the controller 140), the difference operator 192 being configured to subtract the measured pressure 194 from the continuous pressure demand 222 to provide a difference signal 196. This feedback loop provides fine control to correct minor errors in the pressure of the second chamber 110 to meet the continuous pressure demand 222.

The difference signal 196 is input to (in this example) a proportional integral (PI) control block 198 which in turn provides a control signal 199 to a summing operator 200. Also provided to the summing operator 200 is an input 202 which enables the algorithm to take into account measurements (e.g. measurements of speed, acceleration) of the motion of the actuator shaft 112 (e.g. rate of change of volume 204 of the second chamber 110) and knowledge of the compliance of the volume of the second chamber 110 (i.e. volume 206 of chamber 110 and the stiffness 208 of the hydraulic working fluid) to determine the required flow to or from the second chamber 110. For example, measurements of the motion of the actuator shaft 112 can be used by the algorithm to determine the flow rate required to maintain constant pressure in the chamber 110 taking into account motion of the actuator shaft 112. Knowledge of the compliance of the volume of the second chamber 110 can be used by the algorithm to determine change in fluid volume at the working pressure required to achieve a given pressure change. As shown in FIG. 5, knowledge of the compliance of the volume of the second chamber 110 can be taken into account by differentiating the continuous pressure demand with respect to time and multiplying the differentiated continuous pressure demand by the volume of chamber 110 divided by the fluid stiffness. This is then taken into account, together with the rate of change of actuator volume, to provide the input 202 to the summing operator 200.

The output of the summing operator 200 is fed as a flow demand signal to the pump-motors 150, 152 which delivers a flow rate of hydraulic fluid to or from the second chamber 110 as close as possible to the flow demand. It will be understood that the flow rate of hydraulic fluid flowing into or out of the second chamber 110 typically refers to the volume of hydraulic fluid flowing into or out of the second chamber per unit time, but that this may be delivered by controlling a volume of hydraulic fluid flow to or from the pump-motors 150, 152 per cycle of rotation of the rotatable shaft 151. The delivered flow rate, together with the volume 230 of the chamber 110 (which is determined by the externally induced motion 232 of the actuator shaft 112 of the first actuator 100), determine the pressure in the second chamber 110.

It will be understood that, in an alternative embodiment, the pressure within the chamber 110 can be controlled by providing the pump-motors 150, 152 with a continuous pressure demand signal, in which case the pump-motors 150, 152 are operable to determine the required flow rate of hydraulic fluid into or out of the chamber 110 to meet with pressure demand signal and to control the displacement (e.g. by activating and deactivating working chambers) accordingly.

This combination of open and closed loop control enables the second chamber 110 to accurately correct for the difference between the contribution to the overall demand by the first chambers 104-108, 141-144 and the overall demand itself, reducing (preferably removing) the effect of the steps in the contribution from the first chambers 104-108, 141-144.

As explained above, FIG. 6 shows the discretised load demand 220 and the continuous demand 222 (being the error between the load delivered by the first chambers 104-108, 141-144 and the overall demand 180). Also shown in FIG. 6 is the overall output 224 provided by the chambers 104-110, 141-144 which faithfully follows (and is therefore overlaid on) the overall demand 180, other than for a portion 224a where the demand cannot be met due to saturation (i.e. the demand exceeds the capability of the actuator 100).

Referring back to FIG. 3, a system pressure relief valve 169 is connected between the pump-motors 150, 152. A further system pressure relief valve 171 is provided between the reservoir 122 and the accumulator 120. A further electrical generator 172 is connected to the accumulator 120 by way of a variable displacement motor 173 configured to receive pressurised fluid from the accumulator 120 and to convert received pressurised fluid from the accumulator 120 into torque on a shaft 174 which drives the generator 172 to generate electrical energy.

Typically the valves in the banks 124 are selected and tuned to provide the best overall response in combination with the second chamber 110. For example, the valves in the banks 124 may be selected such that the peak rate of change of the pressure acting in the first chambers 104-108, 141-144 can be matched by the second chamber 110. This allows the contribution of the second chamber 110 to compensate for a step change contributed by a first chamber 104-108, 141-144 to the load.

The controller 140 may of course include constraints to ensure that the overall output remains smooth and controlled, and to prevent overload or reaching endstops (for example). In some applications, constraints may be applied by the controller 140 to avoid the overall demand signal 180 from exceeding the capabilities of the hydraulic transmission. The controller 140 may restrict the rate of change of the total load to lie within the load range of the second chamber 110, which is in turn a function of its flow range limit and the compliance of its volume. The controller 140 may similarly be configured to constrain the peak rate of change of pressure acting in the first chambers 104-108, 141-144 to lie within the load range of the second chamber 110.

The fact that most of the flow and power is handled by the first chambers 104-108, 141-144 (and thus the discrete pressure control system), and the fact that the high instantaneous power through the second chamber 110 is exchanged directly between the two pump-motors 150, 152 (rather than through a prime mover or generator) makes the hydraulic transmission disclosed herein particularly suitable for handling large instantaneous power flows while maintaining a very high system efficiency.

Further variations and modifications may be made within the scope of the invention herein described.

For example, although the apparatus for extracting energy from water waves aims to provide a net flow to the accumulator 120 (and to extract energy from the system by way of generators 154, 172), the hydraulic transmission described herein is equally applicable to an actuator system which causes a net flow from the accumulator 120 (that is, an actuator system which is driven by hydraulic fluid from the hydraulic transmission to perform work on a load). In this case, the electricity generator 154 is typically replaced by a prime mover, such as a diesel engine or electric motor, so as to add power to the system. Additionally or alternatively, the electrical generator 172 and variable displacement hydraulic motor 173 may be replaced by a prime mover (such as a diesel engine or electric motor) and a variable displacement hydraulic pump, again so as to add power to the system. Indeed, the hydraulic transmission described herein is generally applicable to any system where high power flows across all four quadrants are required ('four quadrant' means a system that can apply a load in either direction during motion in either direction).

Figure 7:
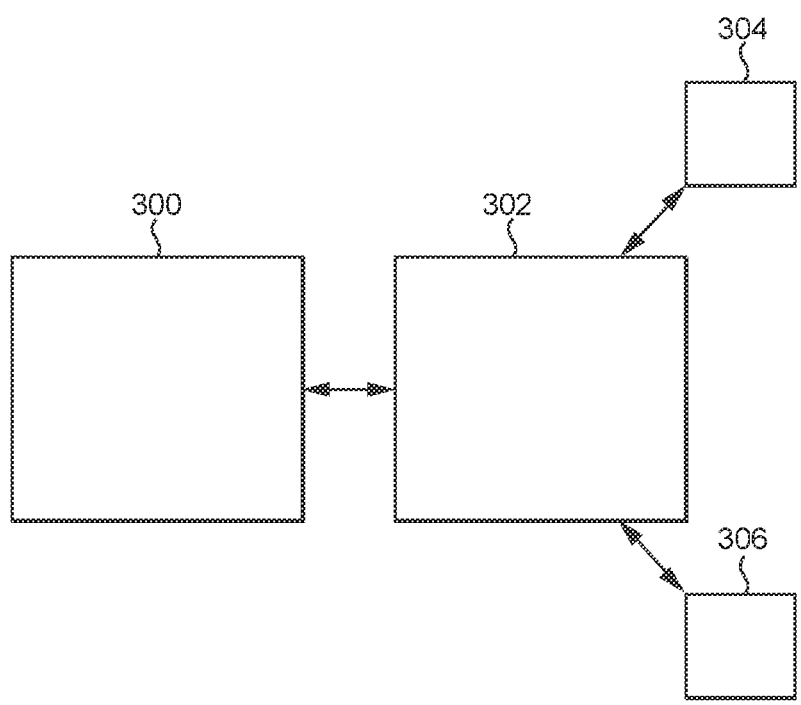
FIG. 7 is a block diagram illustrating the hydraulic transmission of FIG. 3 used in a heave compensation winch.

FIG. 7 is a block diagram of a heave compensation winch comprising an actuator 300 comprising a plurality of chambers (not shown) and a hydraulic transmission 302 configured to selectively control the connection of each of a plurality of the said plurality of first chambers of the actuator to a high pressure fluid store 304 and a low pressure hydraulic fluid reservoir 306 in accordance with a load demand. The hydraulic transmission 302 is also configured to control the pressure in a second chamber of the said plurality of chambers within a continuous range of pressures. In accordance with the principles discussed above, the hydraulic transmission is configured to control the pressure in the second chamber to at least partially compensate for a difference between the contribution of the first chambers to a received demand. In this case, the demand is typically a varying load on a cable which varies the speed of the winding in and out of the cable by the winch. It will be understood that the winch is an example of an application where there is a net flow of power to the actuator. Accordingly, the electricity generator 154 is typically replaced by a prime mover, such as a diesel engine or electric motor, so as to add power to the system and/or the electrical generator 172 and variable displacement hydraulic motor 173 are replaced by a prime mover (such as a diesel engine or electric motor) and a variable displacement hydraulic pump, again so as to add power to the system.

Although seven first chambers 104-108, 141-144 and a single second chamber 110 are illustrated in FIG. 3, it will be understood that any number of first chambers and second chambers could be provided. The best choice of design will depend on the specific application requirements. Typically a minimum of two first chambers and one second chamber will be provided.

Although the chambers 141-144 are illustrated in FIG. 3 as being in parallel with the chambers 104-108, it will be understood that they could alternatively be connected in series.

In some applications, it is possible to use a single pump-motor 150 in place of the pair of pump-motors 150, 152 of the continuous pressure control system of FIG. 3.

In some embodiments, the variable displacement pump-motors 150, 152 can be replaced by variable flow control valves, each of which is configured to regulate the flow of hydraulic fluid between the second chamber 110 and the accumulator 120 or the reservoir 122.

Although a linear actuator 100 is described above, the hydraulic transmission may additionally or alternatively comprise one or a number of rotary actuators comprising one or more chambers whose pressures are controlled discretely and one or more chambers whose pressures are controlled over a continuous range of pressures in a similar way to the linear actuator 100 to create a rotary output directly or through a gear system, or indeed a linear output using, for example, a rack and pinion system.

The invention claimed is:

1. A hydraulic fluid power transmission comprising:
    actuator apparatus having a plurality of chambers, each of the chambers having a respective fluid driving surface configured to drive or be driven by hydraulic fluid therein;
    a discretised pressure control system including a plurality of bodies configured to contain hydraulic fluid therein, wherein each of the plurality of bodies is configured to function as a hydraulic fluid source or a hydraulic fluid sink, wherein at least two of the plurality of bodies have different fluid pressures, and wherein the discretised pressure control system is configured to selectively connect each of a plurality of first chambers of the plurality of chambers, independently, to respective ones of the plurality of bodies to produce a stepped load profile;
    a continuous pressure control system configured to control the pressure of hydraulic fluid, or a flow rate of hydraulic fluid, input to or output from one or more second chambers of the said plurality of chambers; and
    a controller configured to receive a demand signal indicative of a demand value of a property of the actuator apparatus, the property being affected by the hydraulic fluid pressure in the chambers, and to control the discretised and continuous pressure control systems in response to the received demand signal to thereby regulate the property of the actuator apparatus.

2. The hydraulic fluid power transmission according to claim 1 wherein the controller is configured to control the discretised and continuous pressure control systems such that a contribution of the second chambers to the said property of the actuator apparatus at least partially compensates for a difference between a contribution of the said first chambers to the said property of the actuator apparatus and the demand value of the said property of the actuator apparatus indicated by the received demand signal.

3. The hydraulic fluid power transmission according to claim 2 wherein the controller is configured to control the discretised and continuous pressure control systems to thereby regulate the property of the actuator apparatus the received demand signal for the said property of the actuator apparatus.

4. The hydraulic fluid power transmission according to claim 3 wherein the controller is configured to generate a discretised demand and a continuous demand from the said received demand signal for the said property of the actuator apparatus, the controller being configured to control the discretised pressure control system to follow the discretised demand and to control the continuous pressure control system to follow the continuous demand.

5. The hydraulic fluid power transmission according to claim 4 wherein the discretised demand is determined by offsetting the received demand for the said property of the actuator apparatus.

6. The hydraulic fluid power transmission according to claim 5 wherein the discretised demand is determined by offsetting the received demand by half the load range available from an individual second chamber of the said second chambers.

7. The hydraulic fluid power transmission according to claim 1 wherein the continuous pressure control system comprises one or more variable displacement pump/motors operable to operate as a pump or as a motor in different operating modes.

8. The hydraulic fluid power transmission according to claim 7 wherein the continuous pressure control system comprises a variable displacement pump or a variable displacement motor in a common shaft arrangement with another unit exchanging hydraulic fluid with a high pressure one of the plurality of bodies.

9. The hydraulic fluid power transmission according to claim 8 wherein the common shaft is coupled to a prime mover or energy sink, and wherein the controller is configured to control the net shaft torque to provide a smoothed net power transfer between the common shaft and the prime mover or energy sink.

10. The hydraulic fluid power transmission according to claim 1 wherein the continuous pressure control system is configured to control the pressure or flow rate of hydraulic fluid into or out of one of the one or more second chambers responsive to a change of volume of that chamber.

11. The hydraulic fluid power transmission according to claim 1 wherein the continuous pressure control system is configured to control the flow rate or pressure of hydraulic fluid into or out of a said second chamber to cause a desired change in pressure taking into account the volume of the said second chamber and an effective bulk modulus of the fluid volume.

12. The hydraulic fluid power transmission according to claim 1 wherein the controller is configured to synchronise a change in pressure of at least one of the one or more second chambers with a corresponding change in pressure in one or more of the plurality of first chambers.

13. The hydraulic fluid power transmission according to claim 1 wherein the fluid driving surfaces of the said chambers are coupled to each other such that the forces exerted by hydraulic fluid on the respective fluid driving surfaces of the chambers are additive or subtractive.

14. A method of transmitting hydraulic fluid power, the method comprising:
providing an actuator apparatus having a plurality of chambers, each of the chambers having a respective fluid driving surface configured to drive or be driven by hydraulic fluid therein;
providing a plurality of bodies configures to contain hydraulic fluid therein, each of the plurality of bodies being configured to function as a hydraulic fluid source or a hydraulic fluid sink, wherein at least two of the plurality of hydraulic fluid sources or sinks have different fluid pressures;
receiving a demand signal indicative of a demand value of a property of the actuator apparatus, the property being affected by the hydraulic fluid pressure in the chambers; and
in response to the received demand signal:
selectively connecting each of a plurality of first chambers of the plurality of chambers to one of the plurality of bodies, independently, to produce a stepped load profile; and
controlling the pressure or flow rate of hydraulic fluid input to or output from said one or more second chambers of the said plurality of chambers by varying the pressure or flow rate of hydraulic fluid flowing into or out of the said second chambers within a range of pressures or flow rates respectively to thereby regulate the property of the actuator apparatus.

* * * * *